(12) United States Patent
Meats et al.

(10) Patent No.: US 11,604,444 B1
(45) Date of Patent: Mar. 14, 2023

(54) MODULAR ROOF ARRAY

(71) Applicants: James L.E. Meats, Springfield, MO (US); Jeffery F. Kallenberger, Springfield, MO (US); Robert A. Valbracht, Springfield, MO (US)

(72) Inventors: James L.E. Meats, Springfield, MO (US); Jeffery F. Kallenberger, Springfield, MO (US); Robert A. Valbracht, Springfield, MO (US)

( * ) Notice: Subject to any disclaimer, the term of this patent is extended or adjusted under 35 U.S.C. 154(b) by 0 days.

(21) Appl. No.: 17/197,586

(22) Filed: Mar. 10, 2021

Related U.S. Application Data

(60) Provisional application No. 62/987,457, filed on Mar. 10, 2020.

(51) Int. Cl.
*G05B 19/042* (2006.01)
*H02P 5/68* (2006.01)

(52) U.S. Cl.
CPC .............. *G05B 19/042* (2013.01); *H02P 5/68* (2013.01); *G05B 2219/2614* (2013.01)

(58) Field of Classification Search
CPC .......... G05B 19/042; G05B 2219/2614; H02P 5/68
See application file for complete search history.

(56) References Cited

U.S. PATENT DOCUMENTS

| | | | |
|---|---|---|---|
| 5,492,082 A | 2/1996 | Krevinghaus et al. | A01K 1/0047 |
| 7,137,775 B2 | 11/2006 | Hopkins | F04D 27/0261 |
| 9,188,355 B1 * | 11/2015 | Allen | F24F 11/77 |
| 10,989,206 B1 | 4/2021 | Kallenberger et al. | F04D 29/403 |
| 2017/0159960 A1 * | 6/2017 | Hopkins | F24F 11/30 |
| 2021/0028728 A1 * | 1/2021 | Gennello | H02P 5/68 |

* cited by examiner

*Primary Examiner* — Michael W Choi
(74) *Attorney, Agent, or Firm* — Jonathan A. Bay

(57) ABSTRACT

A Modular Fan Array of a 2×2 array of small fan modules provides many advantages over the replacement of duty of a solitary large fan, including some of the following advantages: —the combined flowrate capacity of the Fan Array can be sized equal to or in excess of the 100% flowrate capacity of the large fan, however a turndown limit of 50% will result in the Fan Array only having a turndown limit of 12.5%. There is a redundancy fan modules. With one going OFFLINE the other three can provide some measure of ventilation, while with the large fan going OFFLINE, ventilation is disable completely.

13 Claims, 17 Drawing Sheets

Cost of Operation (1)
$0.10 per kwh
Operating Hours – 8,760 per year
100 Fans

| Demand | % of Operating Hours | Fans Operating | Power Consumption kwh |
|---|---|---|---|
| 20% | 5 | 100 | 89,746 |
| 40% | 25 | 100 | 448,731 |
| 60% | 25 | 100 | 775,407 |
| 80% | 25 | 100 | 1,838,002 |
| 100% | 20 | 100 | 2,871,878 |
| | | Total | 6,023,765 kwh |
| | | Total | 602,376 USD |

FIG. 11

Cost of Operation (2)
$0.10 per kwh
Operating Hours – 8,760 per year
100 – 2x2 MRA's Capable of 80,000 cfm
Operating at 60,000 cfm

| Demand | % of Operating Hours | Fans Operating | Power Consumption kwh |
|---|---|---|---|
| 20% | 5 | 100 | 31,575 |
| 40% | 25 | 100 | 260,172 |
| 60% | 25 | 100 | 416,858 |
| 80% | 25 | 100 | 520,344 |
| 100% | 20 | 100 | 813,038 |

Total  2,041,986 kwh
Total  204,199 USD

Annual Savings = $398,178

FIG. 12

Cost of Operation (3)
$0.10 per kwh
Operating Hours - 8,760 per year
75 - 2x2 MRA's Capable of 80,000 cfm
Operating at 80,000 cfm

| Demand | % of Operating Hours | Fans Operating | Power Consumption kwh |
|---|---|---|---|
| 20% | 5 | 75 | 46,253 |
| 40% | 25 | 75 | 205,568 |
| 60% | 25 | 75 | 390,258 |
| 80% | 25 | 75 | 925,056 |
| 100% | 20 | 75 | 1,445,400 |

Total  3,012,535 kwh
Total  301,253 USD

Annual Savings = $301,253

FIG.13

Cost of Operation (4)
$0.10 per kwh
Operating Hours – 8,760 per year
100 – 1x3 MRA's Capable of 60,000 cfm
Operating at 60,000 cfm

| Demand | % of Operating Hours | Fans Operating | Power Consumption kwh |
|---|---|---|---|
| 20% | 5 | 100 | 26,017 |
| 40% | 25 | 100 | 260,172 |
| 60% | 25 | 100 | 878,080 |
| 80% | 25 | 100 | 925,056 |
| 100% | 20 | 100 | 1,445,400 |

Total 3,534,726 kwh
Total 353,473 USD

Annual Savings = $248,904

FIG. 14

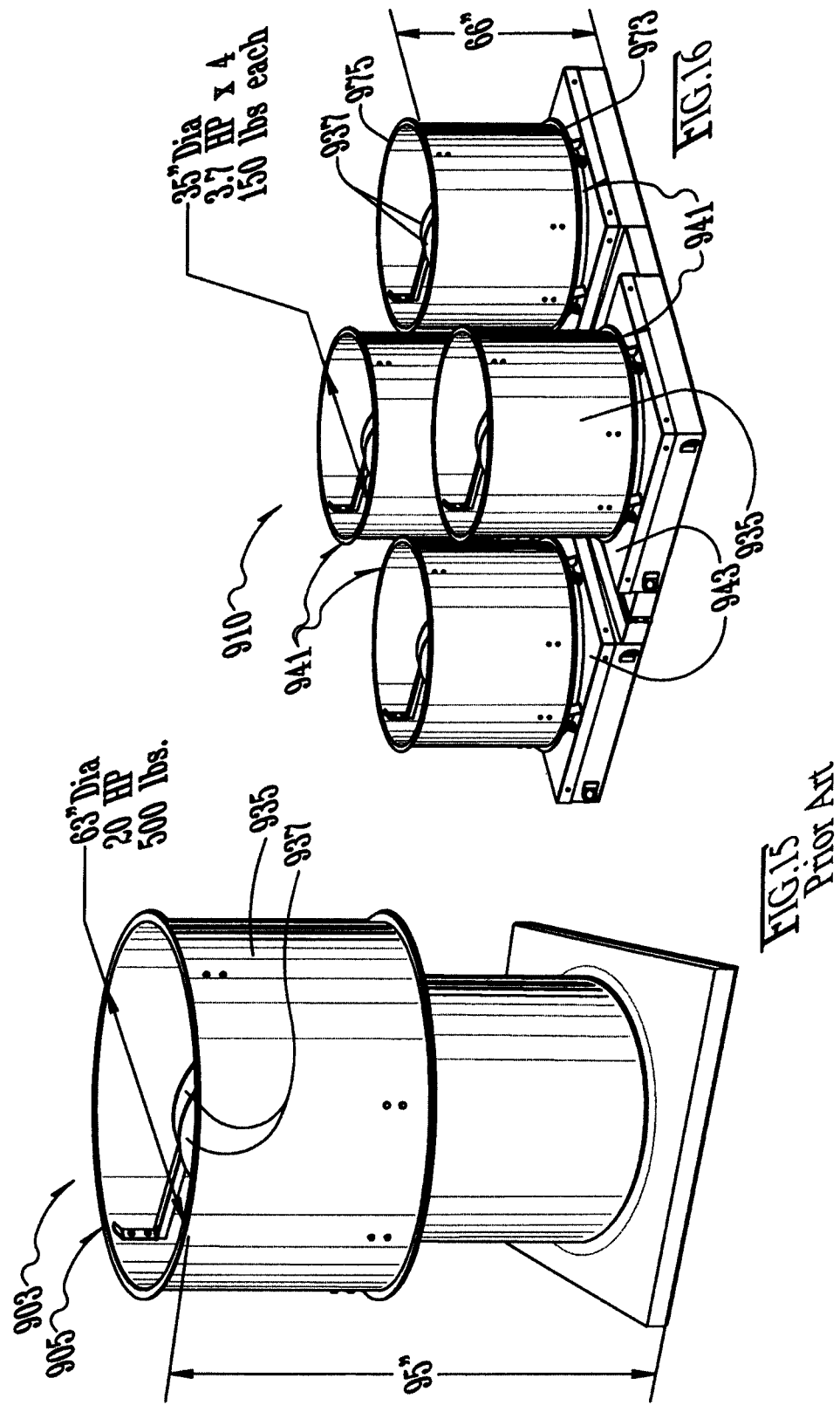

MODULAR ROOF ARRAY

CROSS-REFERENCE TO PROVISIONAL APPLICATION(S)

This application claims the benefit of U.S. Provisional Application No. 62/987,457, filed Mar. 10, 2020. The foregoing patent disclosure(s) is(are) incorporated herein by this reference thereto.

BACKGROUND AND SUMMARY OF THE INVENTION

The invention relates to air-moving equipment and, more particularly, to a modular array of fans or blowers typically mounted on a roof of commercial, institutional, military and/or governmental buildings. A non-limiting example might be represented by upblast roof-exhaust fans, but this does not limit the invention to upblast fans nor roof fans exclusively.

This invention is commonly-owned with U.S. Pat. No. 10,989,206, entitled "CONTROL SYSTEM HUB FOR BLOWER CONTROLS," the disclosure of which is incorporated herein by this reference thereto as if fully set forth next.

FIG. 15 shows an installation 903 in accordance with the prior art of a solitary upblast roof exhaust fan 905 (see, eg., FIG. 17). The fan 905 might have a typical propeller 907 driven by an electronic commutator (EC) motor 909 (see FIGS. 5 and/or 6).

What follows here in two parts is, (1) a background on how the electronic commutator (EC) motor 909 is a common and good factor shared between a solitary fan installation 903 in accordance with the prior art and the fan arrays 910 in accordance with the invention, as well as (2) shortcomings in other respects for a solitary fan installation 903 in accordance with the prior art.

As the FIG. 17 block diagram shows, a solitary fan installation 903 in accordance with the prior art will be controlled by a control signal 911. In some cases, the control signal 911 can be fed directly from a sensor 913, but this direct feed from sensor 913 to fan 905 is not shown. Alternatively, it is preferred that the control signal 911 comes from a control circuit (device) 915 that is linked to a plurality of sensors 913 of different kinds, and then sends the control signal 911 to the fan 905 based on programming or functionality within the control device 915.

Again, this control device 915 would be linked for receiving information communications and/or electric signals 921 from one or more sensors 913 associated with the indoor environment or air ducts of the building of whose roof the FIG. 15 fan 905 is mounted on (building and roof are not shown).

The FIG. 17 control device 915 might be set to run the fan 905's motor to maintain a pressure on pressure differential sensor 913 (eg., while not explicitly shown, such a sensor 913 could combine a Pitot tube in the air duct and another pressure tap outside the air duct) at a given setting, say, 0.2 inches of water. Preferably, the fan 905's motor is an electronic commutator (EC) motor, which in brief means, that it has a built-in speed controller (not shown).

Again, electronic commutator (EC) motors 909 are a common and good factor shared between a solitary fan installation 903 in accordance with the prior art and the fan arrays 910 in accordance with the invention.

More particularly, the control device 915 includes the correct transformer required to match the input infeed public utility power line supply 923 (typically anywhere from 120 VAC and/or 240 VAC as well as 480 VAC) to the standard 24 VDC electric line power requirement for powering control device 915 (ie., 24 VDC is an apparent industry standard or preference). Such direct current line voltage 925 (eg., 24 VDC) for powering control device 915 will be referred to herein generically as the 'standard power' direct current line voltage 925.

The 'standard power' direct current line voltage 925 not only powers the control device 915, but also powers other plug-n-play devices (eg., 913) in such a control network as supervised by this control device 915 (ie., the "standard power" as used here is in contrast to "first" and other direct current line voltages used later below, which govern 'control responses,' instead of the line voltage/power 925 for simply powering a device 915 and/or 913).

The transformer for the control device 915 also provides a 10 VDC direct current line voltage, which represents the high voltage level for the control device 915 to form and send control signal 911 to the exhaust fan 905. In general, the range of 0 to 10 VDC for the control or information signal 911 sent to the EC motor 909 corresponds to an instruction to the EC motor 909 to operate between 0% to 100% (ie., 0 to 100 percent) respectively of the EC motor 909's highest rated speed. In practice, EC motors 909 have a practicable operating range of about between 20% and 100% of its highest rated speed for the EC motor 909, which corresponds to between about 2 VDC to 10 VDC. In other words, the 2 VDC signal corresponding to 20% of the EC motor 909's highest rated speed represents a cut-out limit. That is, the EC motor 909 cuts-out and cuts-off at below the cut-out limit, which is about a 20% of the EC motor 909's highest rated speed, or 2 VDC.

However, that is an insignificant factor because of a more significant, higher value "turndown limit" described more particularly below.

So the control signal 911 is produced from a first direct current line voltage, which here for example is 10 VDC. If the control device 915 sends the fan 905 a 10 VDC control signal 911, the fan 905 will operated at its highest rated speed (ie., 100% of its highest rated speed).

If the control device 915 sends the fan 905 a 7.5 VDC control signal 911, the fan 905 will operate at 75% of the EC motor 909's highest rated speed. And so on, until the control device 915 sends the fan 905 about a 2.0 VDC signal or less, and which low levels the EC motor 909 then cuts-out.

To go back to FIG. 15, a solitary fan installation 903 in accordance with the prior art is typically a large fan 905. The fan 905 will be sized according to an engineer-specified (or architect or other designer) maximum volumetric air flowrate. So that specified maximum flowrate will specify at least a minimum size of the exhaust fan installation 903 including its EC motor, propeller dimensions and so on.

Such a roof exhaust fan 905 as shown in FIG. 15 is typical of a class of large roof mounted fans 905 that are indeed large. They have large diameter propellers, up to seventy-two inches in diameter. And buried inside the fan housing, they have heavy motors, up to five hundred pounds. When one of these large roof exhaust fans 905 needs repair, this generally entails maintenance workers doing any of (1) working over an open hole, or (2) working from twenty or more feet in the air, or else (3) a using a crane to remove the fan 905 from the roof, and so on, all of which are hazardous activities.

And the maintenance operation often leaves an opening in the roof that must be covered while the fan 905 is taken down to maintain a weather-tight roof.

So one issue with solitary fan installations 903 in accordance with the prior art is that maintenance is very often a hazardous activity, and renders the ventilation service served by that fan 905 completely knocked out, completely offline.

Another issue with solitary fan installations 903 in accordance with the prior art is relates to a turndown limit introduced above, but not described in detail.

That is, there is a weatherproofing assembly on the discharge of the fan 905 which includes a windband 935 as well as dampers 937 to keep water out. (See also FIGS. 5 and 6 for another windband 935 and pair of dampers 937.) These dampers 937 are hinged, they are like wings. When closed the dampers 937 are spread apart in a horizontal plane. When there is a forced flow of air, the dampers 937 buoy open to some degree. At 100% highest rated flowrate, the dampers 937 are more or less blown straight up parallel to each other.

But because of these dampers 937, the fan 905 can only be modulated down to some threshold limit before the dampers 937 start fluttering, and 'burping,' which makes noise and can damage the dampers 937. This threshold limit is typically at 50% of the highest rated flowrate. There are, however, times and conditions when it would be desirable for the fan 905 to be turned down below 50%, if the dampers 937 would allow it.

So typically on the fan 905, there is an intervening circuit on the fan 905 (intervening circuit not shown) sensing if and whether the control device 915 sends a control signal 911 corresponding to a flowrate below the threshold limit. If so, the intervening circuit cuts off the control signal 911 to the EC motor, and the fan 905 switches OFF.

In other words, this other aggravating issue with a solitary fan installation 903 in accordance with the prior art is that the practicable yield is limited to between about 50% of the highest rated flowrate and 100% of the highest rated flowrate. When in fact, there would be plenty of times when it would be desirable to operate in the range below 50% of the highest rated flowrate (or whatever be the value of the threshold limit).

What is desired for are improvements over the shortcomings of solitary fan installation 903 in accordance with the prior art.

A number of additional features and objects will be apparent in connection with the following discussion of the drawings and preferred embodiment(s) and example(s).

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 11 is a Table entitled "Cost of Operation (1)" of a large-sized solitary upblast roof exhaust fan in accordance with the prior art (eg., FIG. 15), providing data for 100 fans, wherein each fan is capable of 60,000 cfm (ie., 100% highest rated flowrate capacity), and operating at the demand percentages as shown in the Table, wherein the 100% demand value corresponds to 60,000 cfm (ie., the 100% highest rated flowrate capacity);

FIG. 12 is a Table comparable to FIG. 11, except entitled "Cost of Operation (2)," making a cost-savings comparison of the 100 fans of FIG. 11 with 100 2×2 roof fan arrays in accordance with FIG. 1, wherein each array is capable of 80,000 cfm (ie., 100% highest rated flowrate capacity), and operating at the demand percentages as shown in the Table, wherein the 100% demand value corresponds to 60,000 cfm (ie., the 75% highest rated flowrate capacity);

FIG. 13 is a Table comparable to FIG. 11, except entitled "Cost of Operation (3)," making a cost-savings comparison of the 100 fans of FIG. 11 with 75 2×2 roof fan arrays in accordance with FIG. 1, wherein each array is capable of 80,000 cfm (ie., 100% highest rated flowrate capacity), and operating at the demand percentages as shown in the Table, wherein the 100% demand value corresponds to 80,000 cfm (ie., the 100% highest rated flowrate capacity); and FIG. 14 is a Table comparable to FIG. 11, except entitled "Cost of Operation (4)," making a cost-savings comparison of the 100 fans of FIG. 11 with 100 1×3 roof fan arrays in accordance with FIG. 3, wherein each array is capable of 60,000 cfm (ie., 100% highest rated flowrate capacity), and operating at the demand percentages as shown in the Table, wherein the 100% demand value corresponds to 60,000 cfm (ie., the 100% highest rated flowrate capacity);

FIG. 15 is a perspective view of a large-sized solitary upblast roof exhaust fan in accordance with the prior art;

FIG. 16 is a perspective view corresponding to the FIG. 1 perspective view of the 2×2 configuration of a modular fan array in accordance with the invention, except FIG. 16 is shown on a reduced-scale, but is shown on the same scale as FIG. 15 and shown side-by-side with FIG. 15 in order to show the relative size scales therebetween;

DETAILED DESCRIPTION OF THE PREFERRED EMBODIMENTS

Figure 1:
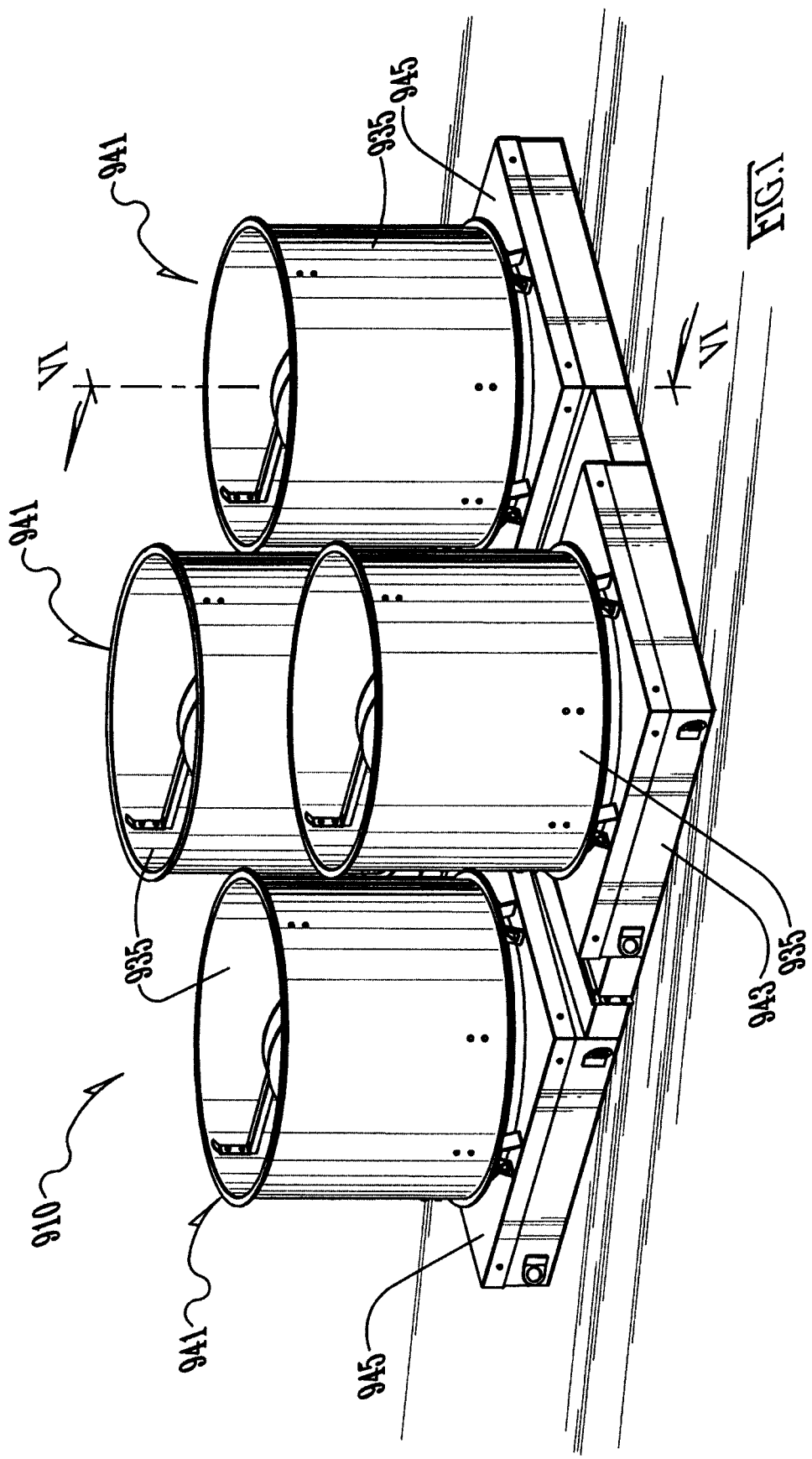
FIG. 1 is a perspective view of a modular fan array in accordance with the invention.
Figure 2:
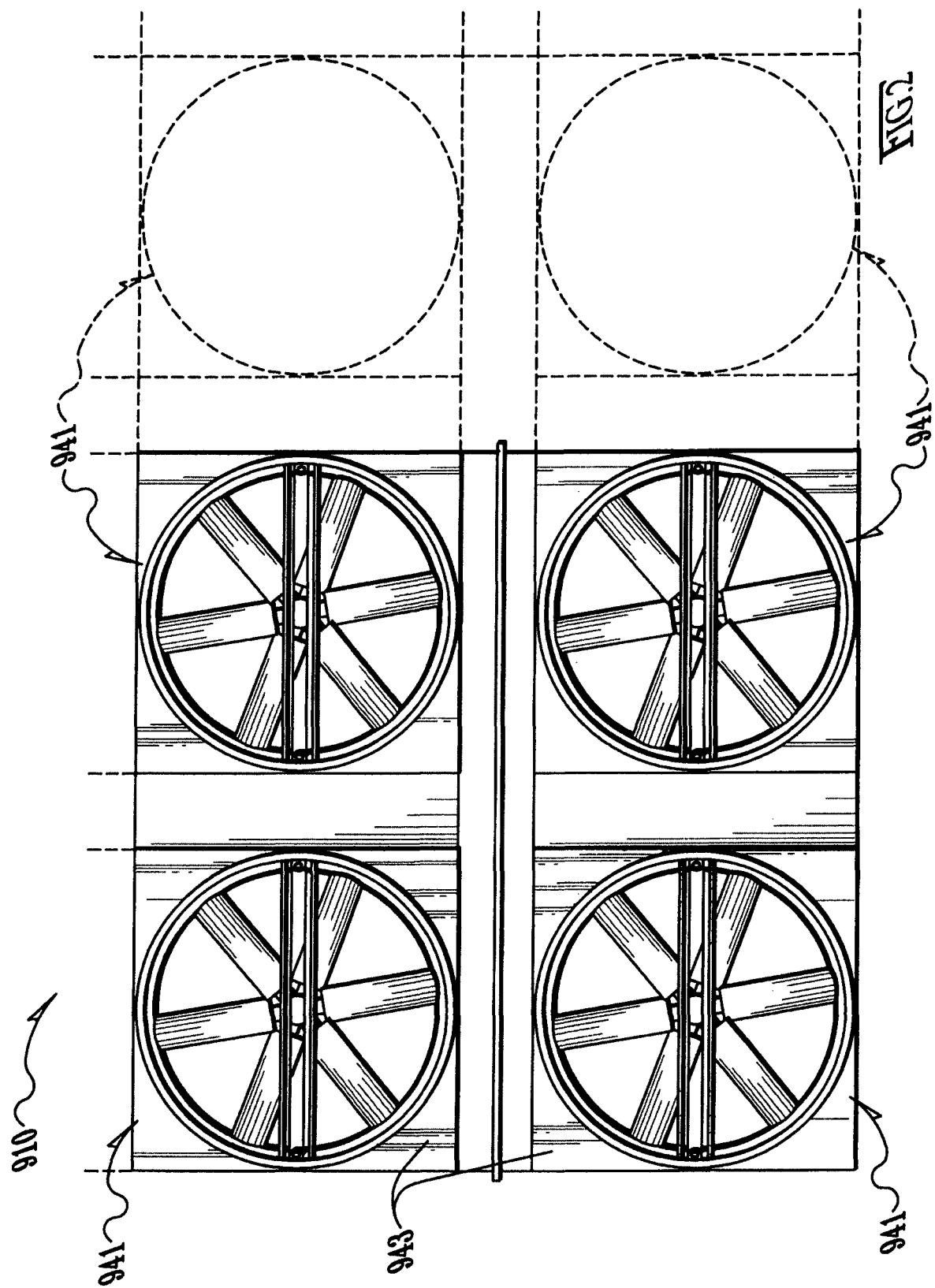
FIG. 2 is a top plan view thereof, with expandability from a 2×2 configuration to a 2×3 configuration shown in dashed line.

FIGS. 1 and 2 show a 2×2 configuration of a modular fan array 910 in accordance with the invention. The array 910 is expandable to 2×3, 2×4 and so on.

Figure 3:
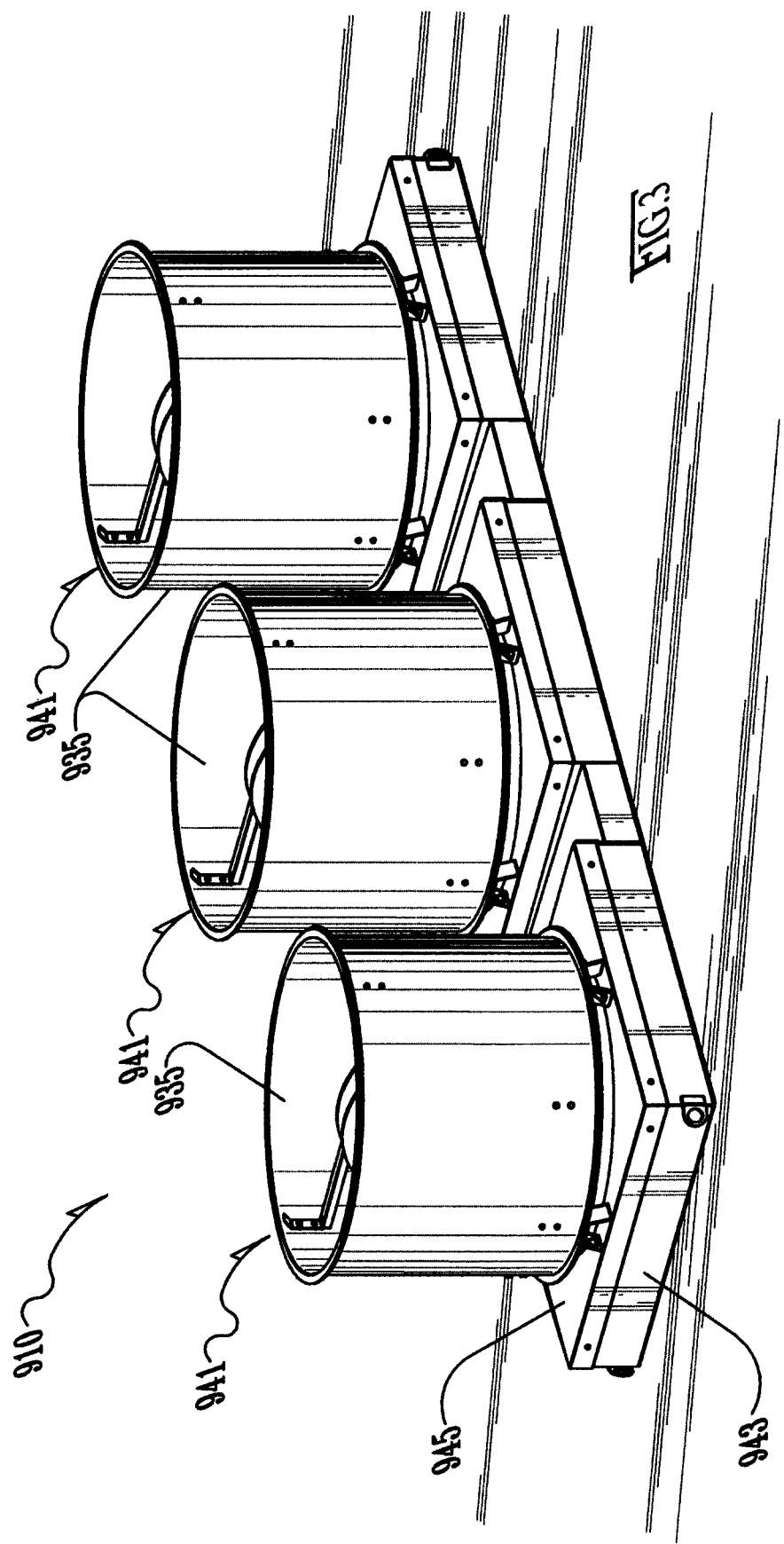
FIG. 3 is a perspective view comparable to FIG. 1 except of an alternate array configuration of a modular fan array in accordance with the invention.
Figure 4:
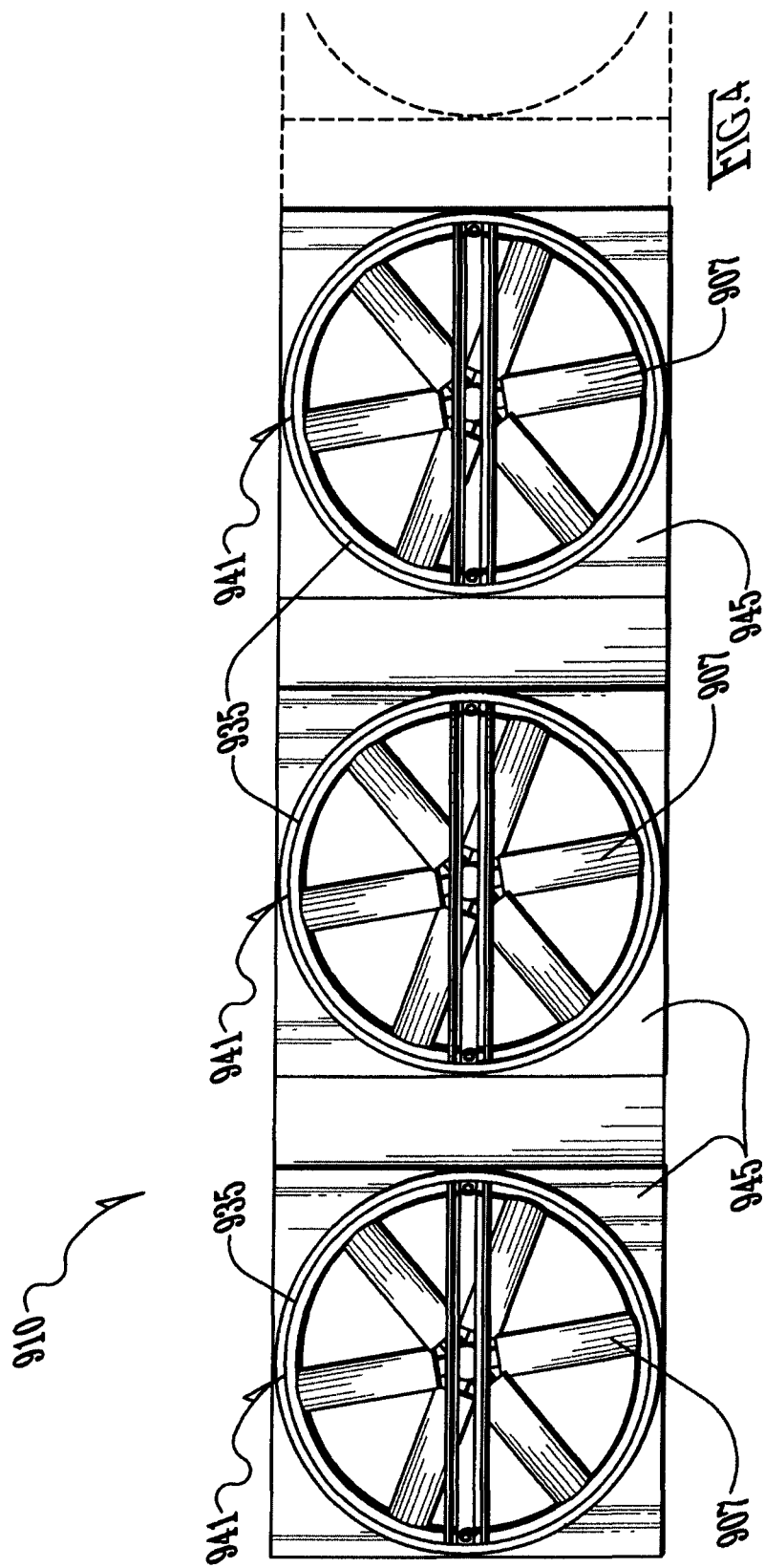
FIG. 4 is a top plan view thereof, with expandability from a 1×3 configuration to a 1×4 configuration shown in dashed line.

FIGS. 3 and 4 show a 1×3 configuration of a modular fan array 910 in accordance with the invention. This array 910 is expandable to 1×4 etc., or 3×3, 3×6 and so on.

It is preferred that, in any given array 910, all the fans 941 are the same size, and powered by the same sized EC motors 909. It is more preferred still that, in any given array 910, each fan 941 is a substantially identical model to all the other fans 941, and each fan 941 is powered by a substantially identical model of EC motor 909. But across different arrays 910, the fan 941 and EC motor 909 sizes can differ according to design preference.

The modular fan arrays 910 use multiple fans 941 to act as one. Instead of one (1) large fan 905, the modular fan arrays 910 use multiple smaller fans 941, usually two to ten (2-10) that act as one. No part requiring maintenance weights more than one-hundred fifty pounds. This eliminates the requirement for a crane. Two maintenance people can lift any component or subassembly. Without crane time, the repair can be implemented in a fraction of the time, usually under an hour.

By having the fans 941 work together as one, it is a capability of the invention to be able to modulate and sequence the fans 941 in Stages in such a way that the total volume in a 2×2 modular fan array 910 like in FIG. 1 can be sequenced down to 12.5%. This can save a lot of energy.

Also, if one of the modular fans 941 needs to be maintained, the fans 941 can be selected in such a way that one fan 941 can be taken out of service and the three remaining fans 941 can ramp up to take up the slack for 100% redundancy. This cannot be done with one fan 905.

Figure 5:
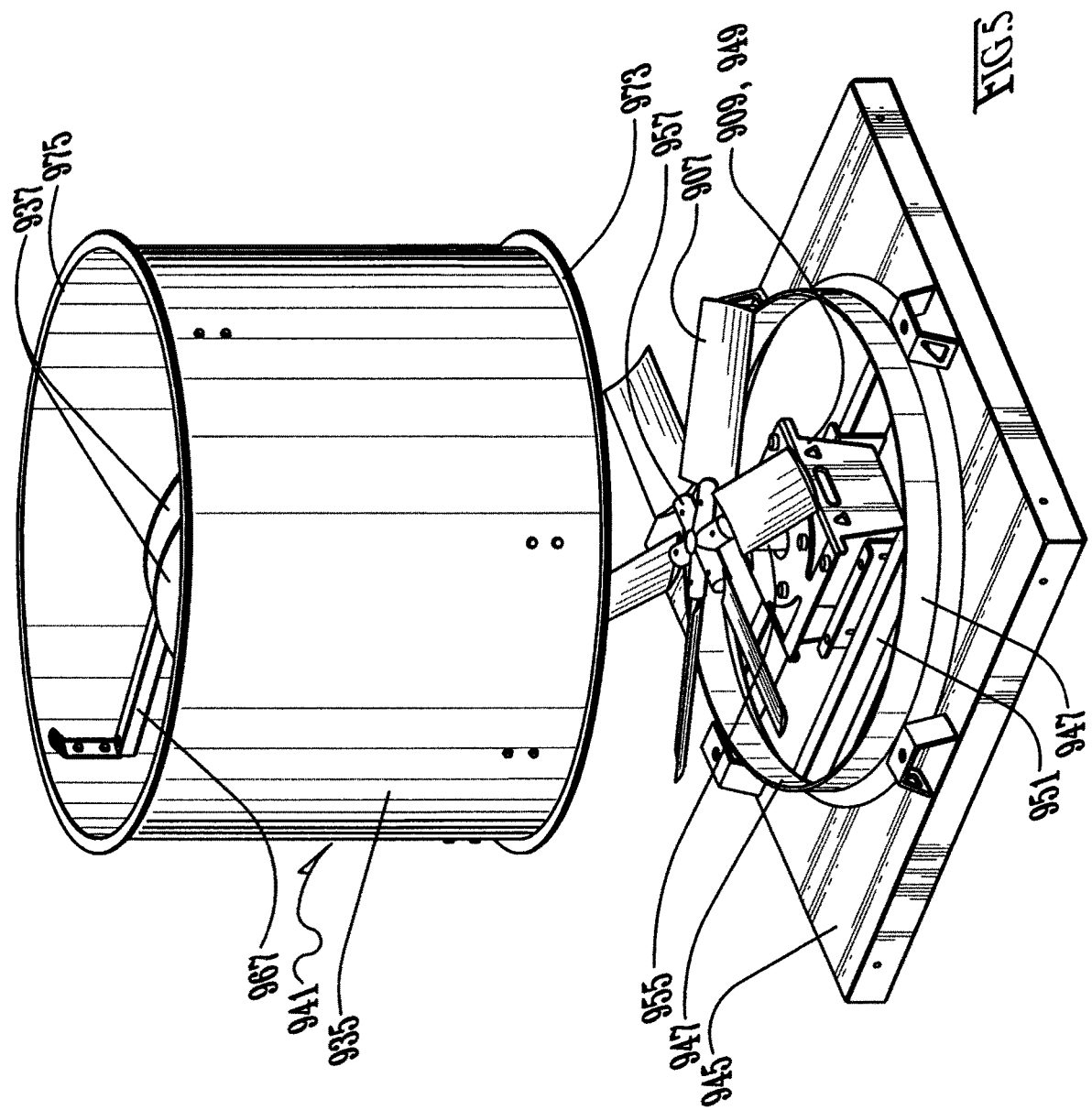
FIG. 5 is an enlarged-scale, exploded perspective view of one representative EC motor-powered, upblast roof exhaust fan of any of the modular fan array configurations in accordance with the invention, including without limitation any inventive modular fan array configurations shown by FIGS. 1 through 4, however this one representative candidate being more particularly the exhaust fan with section-cut cutting line VI-VI in FIG. 1 projected through it.
Figure 6:
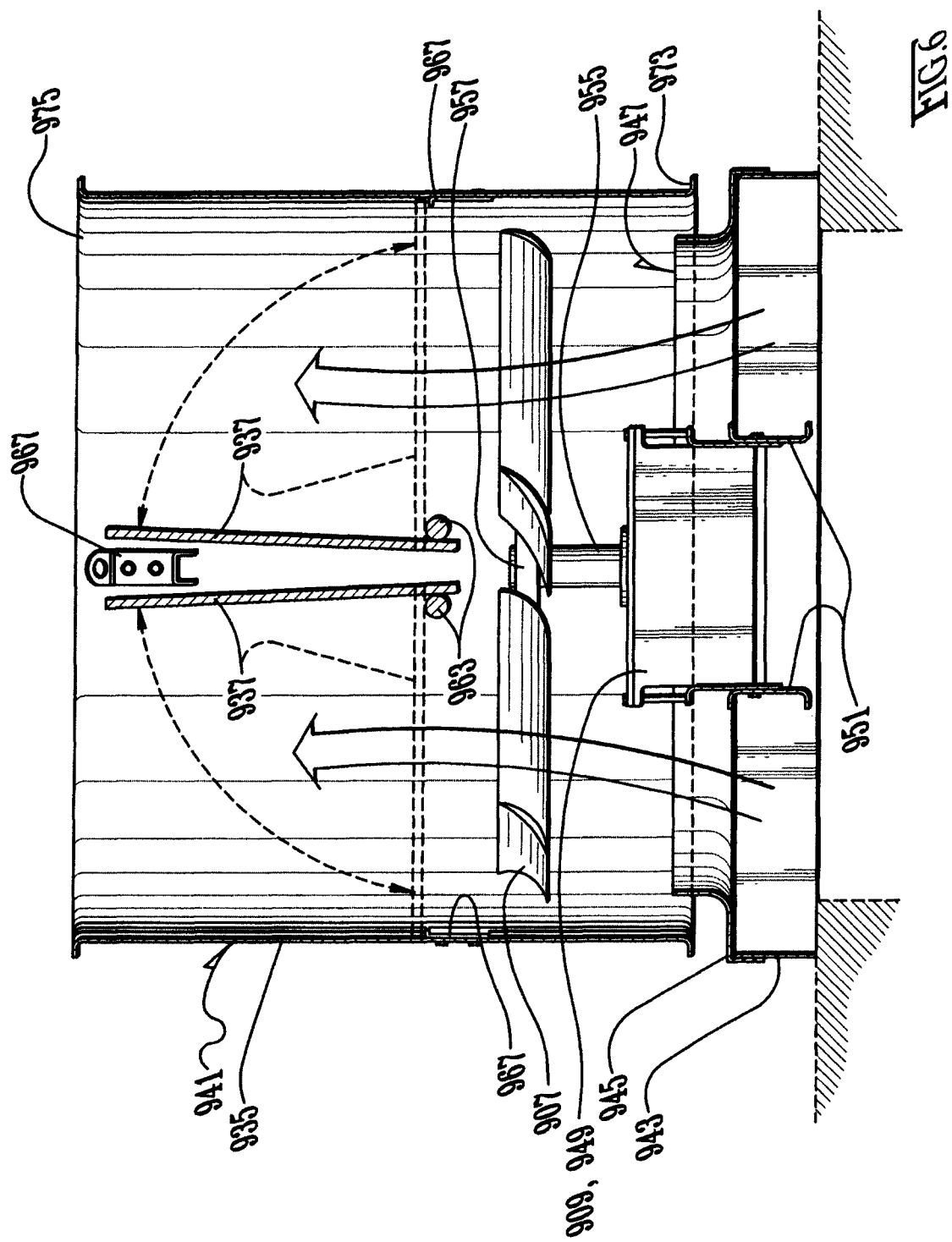
FIG. 6 is an enlarged scale section view taken along line VI-VI in FIG. 1.

FIGS. 5 and 6 show one representative EC motor-powered, upblast roof exhaust fan 941 of any of the modular fan array 910 configurations in accordance with the invention, including without limitation any inventive modular fan array 910 configurations shown by FIGS. 1 through 4.

The fan module 941 comprises a weather curb cap 943 extending up from roof level, a cover 945 to fit over the curb cap 943 and formed centrally with a necked-in lower exhaust port 947, a cylindrical windband 935 propped up off the cover 945, a motor housing 949 supported off cross beams 951 suspended under or anchored to the cover 945 on opposite sides of the opening of the lower exhaust port 947, an EC motor 909, a drive axle 955 and fan propellers 907 radiating away from a top connection 957 with the drive axle 955, and then an opposite pair of weather-protecting dampers 937 pivotally connected on pivot axles 963 spanning across the center columnar hollowness of the windband 935 at about mid-height of the windband 935. The dampers 937 rest shut generally in a common horizontal plane (shown in dashed line in FIG. 6) resting on inward flanges 965 in the inside surface of the tubular windband 935. The dampers 937 wide-open position (shown in solid line in FIG. 6) is stopped by stop bumpers 967 affixed to the inside surface of the windband 935 and above the plane of the common pivot axles 963.

The windband 935 extends from a lower open end with a slightly flared-out flange 973 which forms a cylindrical gap with the cover 945 below, thereby allowing the dragging in of a dilution (or "rooftop") air flow that does not come from within inside the building. The windband 935 terminates in an upper open end 975 which serves as the upper, ultimate exhaust port.

The fans 941 are mounted on a common curb cap 943. This keeps the number of roof openings to a minimum limiting the opportunity for roof leaks.

The modular fan array 910 can be configured in a number of ways to accommodate roof space. There can be a two-by-two (2×2) array 910 as shown in FIGS. 1-2 and 16, or one-by-three (1×3) line up as shown in FIGS. 3 and 4. The fan modules 941 shown are upblast exhaust fans 941. The configuration could involve fan modules 941 configured as hooded exhaust fans (downblast exhaust fans), side discharge (louvered, dampered or hooded discharge) or could even be intake fans in lieu of upblast exhaust fan modules 941.

To skip ahead to FIG. 15, it shows a large-sized solitary upblast roof exhaust fan 905 in accordance with the prior art. This fan 905 is characterized by for example and without limitation the following representative specifications. Namely, the 100% highest rated flowrate capacity for this fan 905 is 60,000 CFM @ 0.4 inches of water. It would have an EC motor rated at 20 HP with 860 RPM being 100% highest rated speed, and weighing up to five hundred pounds. It would have a sixty-three inch diameter propeller, the installation 903 would be ninety-six inches high with a twelve inch curb cap 943.

Other considerations for this fan 905 include:
50% turndown limit:
   Butterfly dampers 937 will flutter below that level,
   Bumpers help but do not eliminate the flutter;
VFD (Variable frequency drive) programming/commissioning:
   Control Schemes/Points,
   Requires Building Management System (BMS) and programmable logic controller (PLC) programming;
Maintenance:
   HEAVY motor (five hundred pounds),
   Big propeller (sixty-three inch diameter),
   Access—confined space, height,
   0% airflow during servicing,
   8 hour replacement time requiring heavy equipment.

FIG. 16 is a perspective view corresponding to the FIG. 1 perspective view of the 2×2 configuration of a modular fan array 910 in accordance with the invention, except FIG. 16 is shown on a reduced-scale, but is shown on the same scale as FIG. 15 and shown side-by-side with FIG. 15 in order to show the relative size scales therebetween.

So comparison can be made, not only visually with inspection of FIGS. 15 and 16, but also with a listing of representative specifications:
Modular Fan Array 910:
   Redundancy
   3.69 HP motors 909
   thirty-five inch diameter Propellers 907
   sixty-six inches high with twelve inch curb cap 943,
   Common Curb Cap 943,
   One roof opening per array 910, and
   a LOREN COOK® provided control system 915, 985.
Advantages of modular fan arrays 910 in accordance with the invention include:
   Flexible Installation—Array 910 can be configured as 1×4, 2×2, or other:

No VFD's required:
EC motors 909 controlled with 0-10V input signal,
Very simple-to-install controls 915, 985,
One control system 915, 985 per array 910.

A further advantage requires some introduction. It involves the turndown limit. For example, a single large fan 905 having a 100% highest rated flowrate capacity of 60,000 cfm is also going to have a 50% turndown limit. The flowrate at the turndown limit is 30,00 cfm. There is no possibility (without unwanted damage due to out of control dampers 937) of operating at below 30,000 cfm.

However, a 2×2 modular fan array 910 in accordance with invention (FIG. 1 or 15) could be preferably assembled with four fan modules 941, each fan module 941 with a 100% highest rated flowrate capacity of 15,000 cfm, then the following can be taken advantage of. If all four fan modules 941 are operating at each one's 100% highest rated flowrate capacity of 15,000 cfm, then the combined 100% highest rated flowrate capacity for all four is 60,000 cfm. That's the same as the one large fan 905.

On the other hand, if three of the four fans 941 are switched OFF, the turndown limit for the one operating fan 941 is going to be 50% of its 100% highest rated flowrate capacity of 15,000 cfm, or 7,500 cfm.

Therefore, by sequencing the operation of the fan modules 941 in Stages (again, 'staging' to be explored more particularly yet below), the 2×2 modular fan array 910 in accordance with invention (FIG. 1 or 15) is operational from 7,500 cfm to 60,000 cfm. Compare that to the one large fan 905's operational range of 30,000 cfm to 60,000 cfm.

This is easier to compare and contrast by percentages. The one large fan 905's operational range ranges from 50% to 100% highest rated flowrate capacity. The 2×2 modular fan array 910 in accordance with invention (FIG. 1 or 15) operational range ranges from 50% of highest rated flowrate capacity of one fan 941 (or 12.5% of the total capacity) to 100% highest rated flowrate capacity of all four fan 941s in combination.

So in the foregoing example, both the one large fan 905 and the 2×2 modular fan array 910 in accordance with invention (FIG. 1 or 15) have the same 100% highest rated total flowrate capacity. But in contrast, the turndown limit for the one large fan 905 would be 50% of the highest rated total flowrate capacity, while the turndown limit for the 2×2 modular fan array 910 in accordance with invention (FIG. 1 or 15) would be 12.5% of the highest rated total flowrate capacity.

Again, stripped down to its essence, the operational range of the 2×2 modular fan array 910 in accordance with invention (FIG. 1 or 15) would be 12.5% to 100%, while for the one large fan 905 it would be 50% to 100%.

Further advantages can be achieved by changing the sizes of the fan module 941 of the 2×2 modular fan array 910 in accordance with invention (FIG. 1 or 15). Namely, their individual 100% highest rated total flowrate capacity could be 20,000 cfm. That way, their combined total 100% highest rated total flowrate capacity would be 80,000 cfm, and the turndown limit would be 50% of highest rated total flowrate capacity of one fan 941, or 10,000 cfm.

So if the preferred ceiling of operation is 60,000 cfm, the one large fan 905 is still only operational between 50% and 100% of the ceiling, while the 2×2 modular fan array 910 in accordance with invention (FIG. 1 or 15) is operational from 16.7% to 100% of the ceiling, with some excess capacity to spare.

In fact, this excess capacity is valuable. Assume for example the one of the four fans 941 in 2×2 modular fan array 910 requires maintenance and has to be taken OFFLINE. The remaining three fans 941 have the combined capacity without the fourth fan 941 to meet the capacity ceiling. Three fans 941 alone remain operational from 16.7% to 100% of the ceiling, although now with no excess capacity to spare.

The concept of Stages, as well as modulating and sequencing the fans 941, will now be dealt more particularly with in connection with FIGS. 7-10, except in reverse order. All these charts represent staging for the 2×2 modular fan array 910 in accordance with invention (FIG. 1 or 16). Hence there will be 4 Stages. (The FIG. 3 1×3 configuration would have just 3 stages.)

Figure 10:
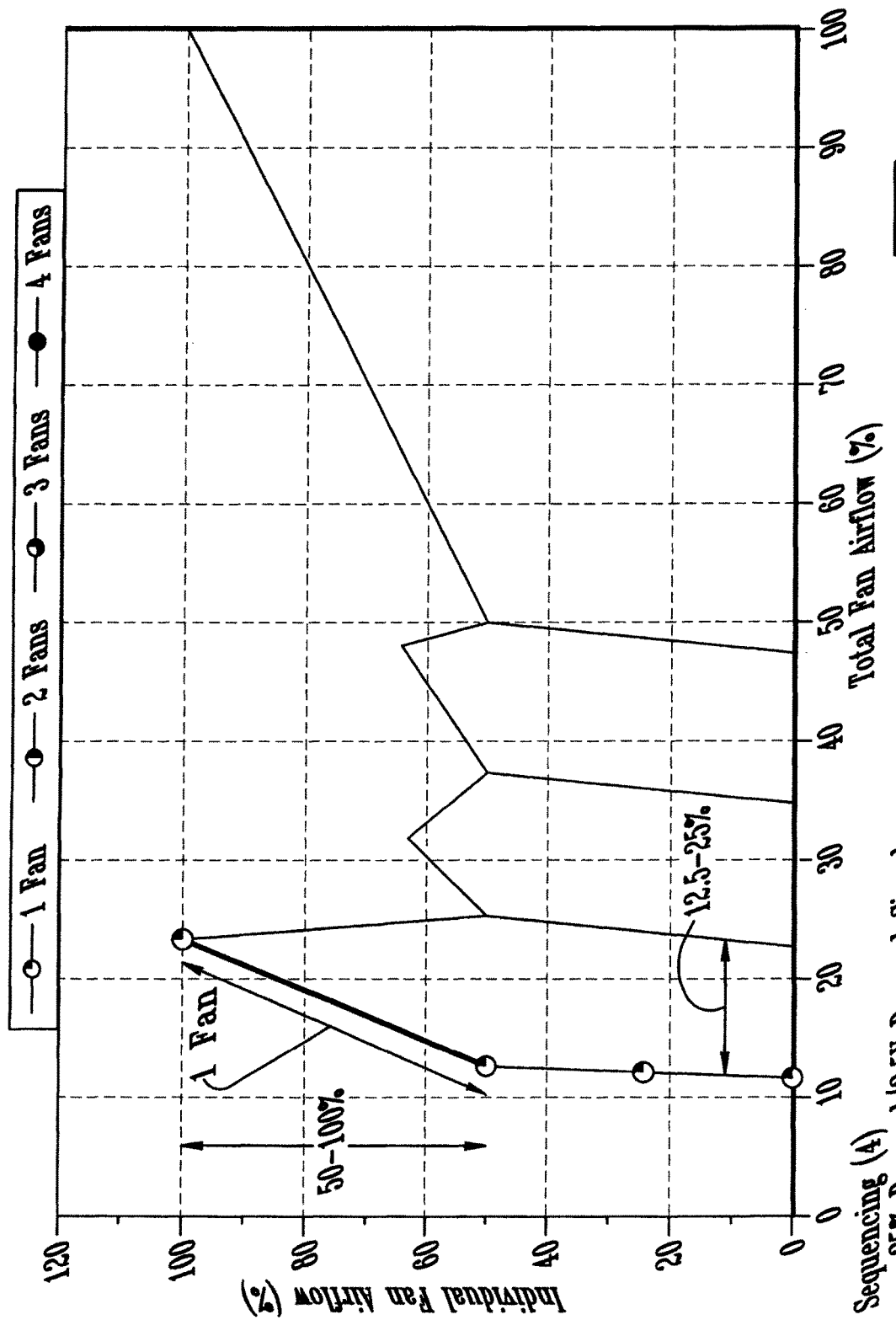
FIG. 10 is a chart comparable to FIGS. 7-9 except showing a 2×2 array Stage 1 sequencing of the operation of the fans of FIG. 1.
Figure 17:
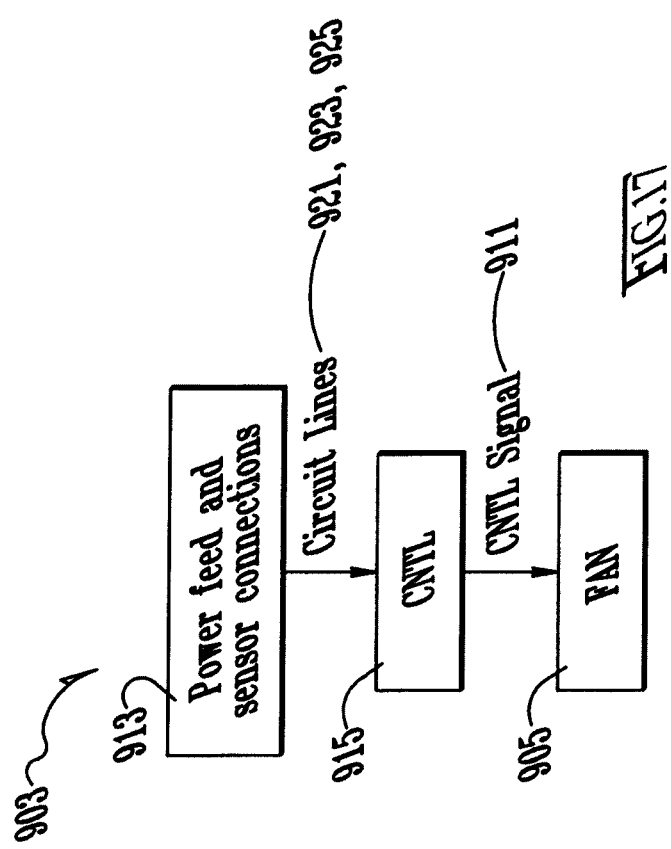
FIG. 17 is a block diagram of control components, circuits and connections for an installation in accordance with the prior art of a solitary upblast roof exhaust fan (eg., FIG. 15)

FIG. 10 is a chart of a 2×2 array 910 Stage 1 sequencing of the operation of the four fans 941 of FIG. 1, wherein the y-axis is a 0-100% scale of any 'single one' of the fans 100% highest rated flowrate capacity, and, wherein the x-axis is a 0-100% scale of 'all four' of the fans 941 combined 100% highest rated flowrate capacity. The control of the sequencing of the staging corresponds to the control matters shown in FIG. 18.

There is actually a 'zeroth' stage. In FIGS. 10 (or 9, 8 and 7), at any capacity on the X-axis below 12.5%, all fans 941 are switched OFF, and there is no air flow. So in FIG. 18, if the CNTL control device 915 sends the FAN ARRAY SEQUENCER 985 a control signal 911 below 1.25 VDC, the FAN ARRAY SEQUENCER 985 switches all fans 941 off.

In FIG. 10 (Stage 1), if the CNTL control device 915 in FIG. 18 sends the FAN ARRAY SEQUENCER 985 a control signal 911 from 1.25 VDC to below 2.5 VDC, the FAN ARRAY SEQUENCER 985 switches a candidate first fan 941 ON (if the candidate first fan 941 doesn't respond by drawing current, the FAN ARRAY SEQUENCER 985 switches another fan 941 ON but just one fan 941), and this fan 941 becomes the STAGE 1 FAN in FIG. 18. The FAN ARRAY SEQUENCER 985 sends the STAGE 1 FAN a control voltage signal 991 which correspond to the received control voltage signal 911 multiplied by the ratio of four available fans 941 to one fan switched ON, or by the multiplier 4. Hence a 2 VDC received control signal 911 will result in an 8 VDC output signal 991 sent to the STAGE 1 FAN only.

And the sequence follows that pattern for the succeeding 3 Stages.

Figure 9:
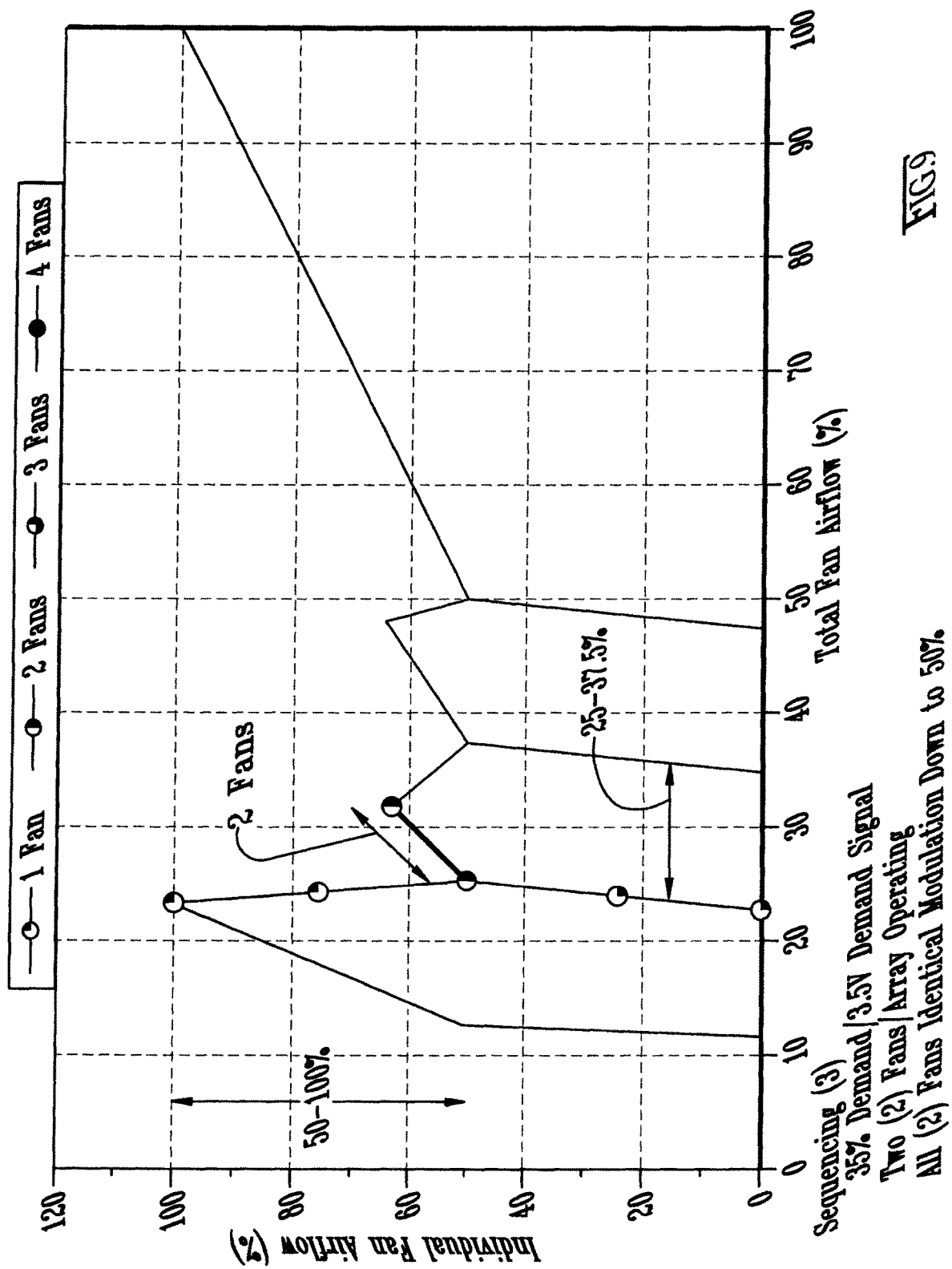
FIG. 9 is a chart comparable to FIG. 7 or 8 except showing a 2×2 array Stage 2 sequencing of the operation of the fans of FIG. 1.

In FIG. 9 (Stage 2), if the CNTL control device 915 in FIG. 18 sends the FAN ARRAY SEQUENCER 985 a control signal 911 from 2.5 VDC to below 3.75 VDC, the FAN ARRAY SEQUENCER 985 switches a candidate second fan 941 ON (if this candidate second fan 941 doesn't respond by drawing current, the FAN ARRAY SEQUENCER 985 switches still a different fan 941 ON but just one more fan 941), and this fan 941 becomes the STAGE 2 FAN in FIG. 18. The FAN ARRAY SEQUENCER 985 sends the both the STAGE 1 FAN and the STAGE 2 FAN a control voltage signal 991 which corresponds to the received control voltage signal 911 multiplied by the ratio of four available fans 941 to two fans 941 switched ON, or by the multiplier 2. Hence a 3 VDC received control signal 911 will result in a 6 VDC output signal 991 sent to the STAGE 1 and 2 FANS only.

Figure 8:
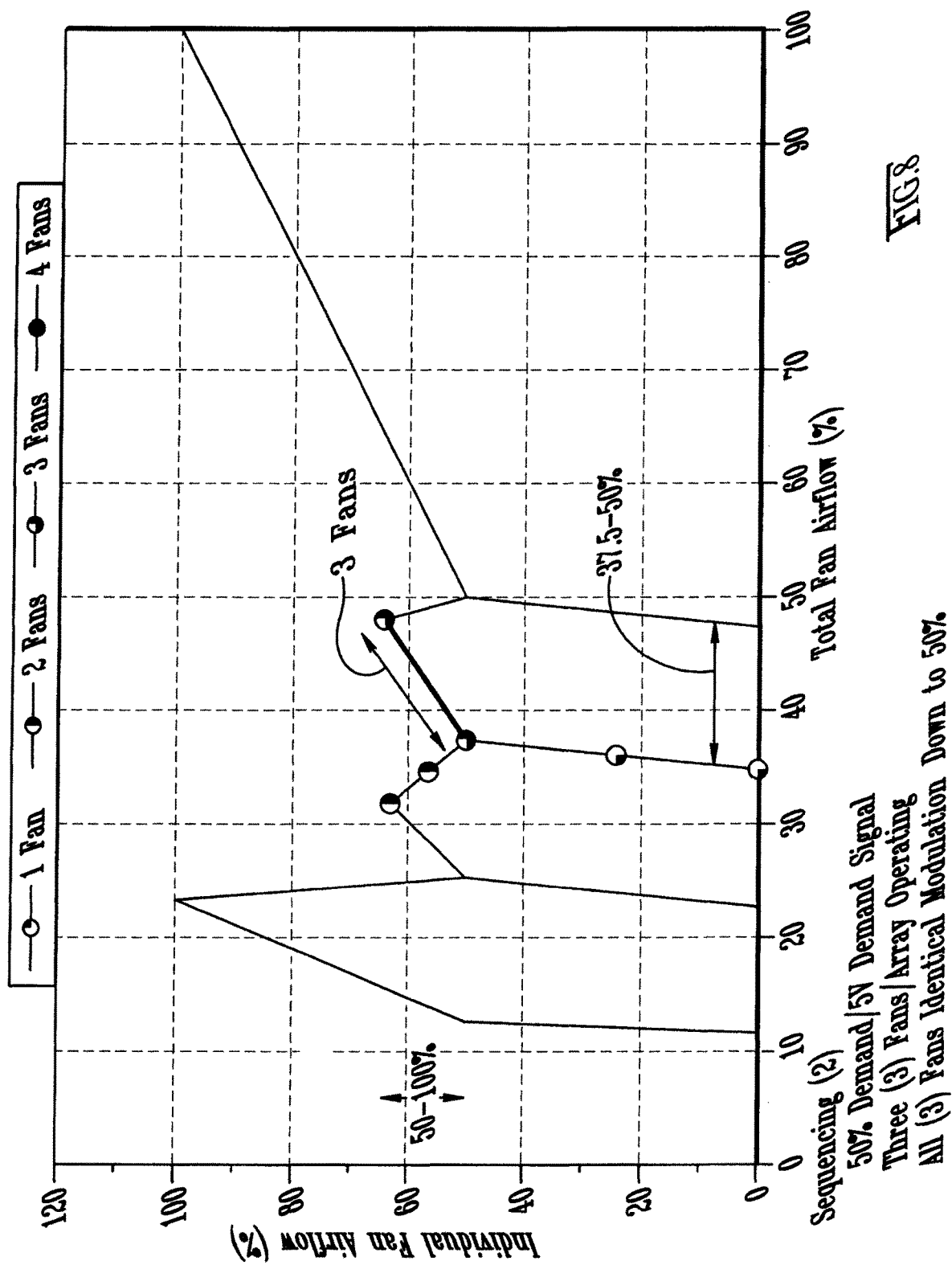
FIG. 8 is a chart comparable to FIG. 7 above except showing a 2×2 array Stage 3 sequencing of the operation of the fans of FIG. 1.

In FIG. 8 (Stage 3), if the CNTL control device 915 in FIG. 18 sends the FAN ARRAY SEQUENCER 985 a control signal 911 from 3.75 VDC to below 5 VDC, the FAN ARRAY SEQUENCER 985 switches a candidate third fan 941 ON (if this candidate fan 941 doesn't respond by drawing current, the FAN ARRAY SEQUENCER 985 switches the last remaining fan 941 ON, but provided it responds), and this fan 941 becomes the STAGE 3 FAN in FIG. 18. The FAN ARRAY SEQUENCER 985 sends the all of the STAGE 1, 2 and 3 FANS a control voltage signal 991 which corresponds to the received control voltage signal 911 multiplied by the ratio of four available fans 941 to three fans 941 switched ON, or by the multiplier 4/3rds. Hence a 4.5 VDC received control signal 911 will result in a 6 VDC output signal 991 sent to the STAGE 1, 2 and 3 FANS only.

Figure 7:
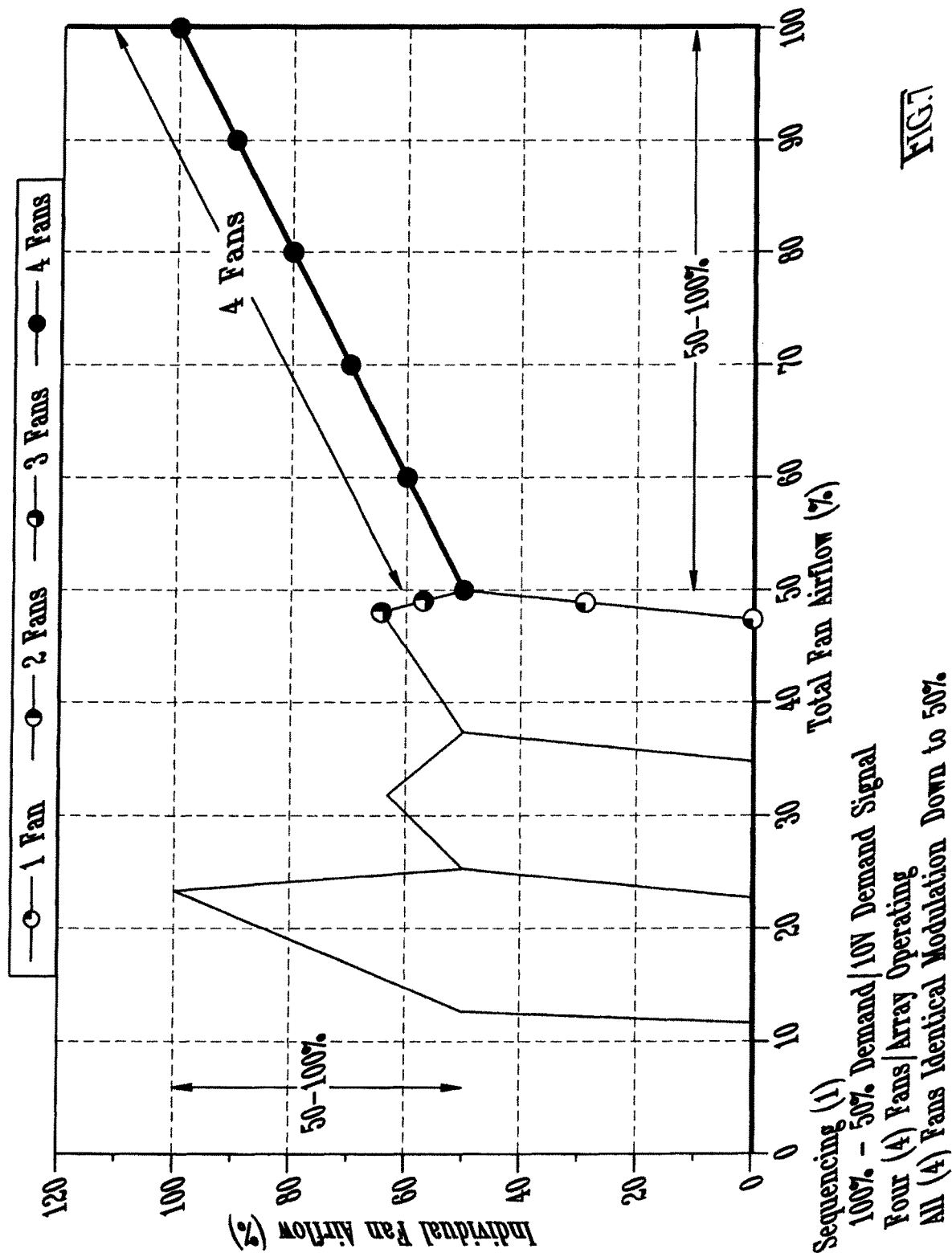
FIG. 7 is a chart of a 2×2 array Stage 4 sequencing of the operation of the four fans of FIG. 1 (the term "Stage" as in Stages 1-4 to be described more particularly below), wherein the y-axis is a 0-100% scale of any 'single one' of the fans 100% highest rated flowrate capacity, and, wherein the x-axis is a 0-100% scale of 'all four' of the fans combined 100% highest rated flowrate capacity.
Figure 18:
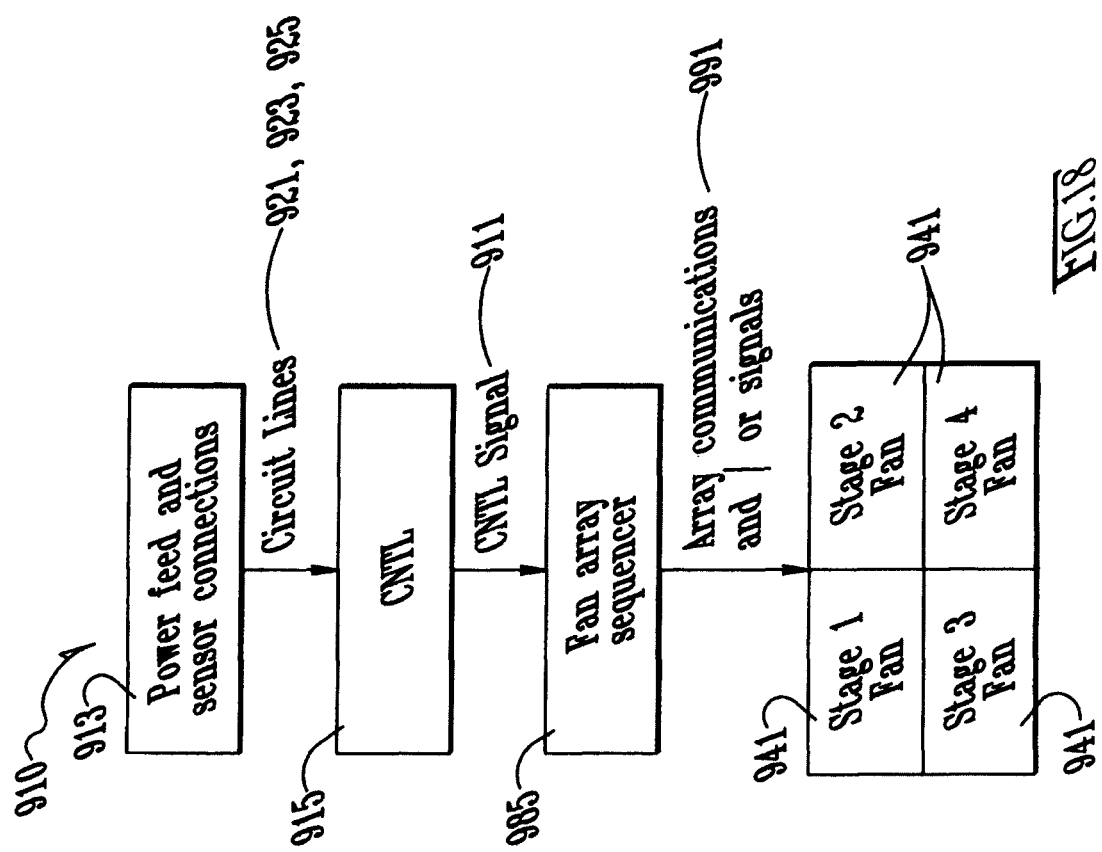
FIG. 18 is a block diagram comparable to FIG. 17, and including many of the same components, except showing the additional or distinctive aspects of control over a 2×2 modular fan array in accordance with the invention (eg., either FIG. 1 or 16).

In FIG. 7 (Stage 4), if the CNTL control device 915 in FIG. 18 sends the FAN ARRAY SEQUENCER 985 a control signal 911 from 5 VDC to 10 VDC, the FAN ARRAY SEQUENCER 985 switches a fourth fan 941 ON (if it doesn't respond by drawing current, that's it), and this fan 941 becomes the STAGE 4 FAN in FIG. 18. The FAN ARRAY SEQUENCER 985 sends the all of the STAGE 1, 2, 3 and 4 FANS a control voltage signal 991 which corresponds to the received control voltage signal 911 multiplied by the ratio of four available fans 941 to four fans 941 switched ON, or by the multiplier 1. Hence an 8 VDC received control signal 911 will result in an 8 VDC output signal 991 sent to the STAGE 1, 2, 3 and 4 FANS.

If however, no fan 941 responded to the call 991 of being the STAGE 4 FAN, the FAN ARRAY SEQUENCER 985 might continue to operate the three responding fans 941 in a modified Stage 3 sequence, except wherein when the received signal 911 is 7.5 VDC or greater, then the FAN ARRAY SEQUENCER 985 would hold the sent signal 991 at 10 VDC.

Pause can be taken to return to the example of a 2×2 array 910 whose 100% combined total capacity (eg., 80,000 cfm) is in excess of the specified ceiling capacity (eg., 60,000 cfm). In such case, the FAN ARRAY SEQUENCER 985 could operate as described the preceding paragraph, the modified Stage 3 sequence. Or else the FAN ARRAY SEQUENCER 985 could engage in a modified Stage 4 sequence, where once the received signal 911 was 7.5 VDC or in excess, the FAN ARRAY SEQUENCER 985 would hold the sent signal at 7.5 VDC.

And so on, the modifiers and scalers given in the examples above broadly being applicable to other array 910 configurations.

FIG. 11 is a Table entitled "Cost of Operation (1)" of a large-sized solitary upblast roof exhaust fan 905 in accordance with the prior art (eg., FIG. 15), providing data for one hundred fans 905, wherein each fan 905 is capable of 60,000 cfm (ie., 100% highest rated flowrate capacity), and operating at the demand percentages as shown in the Table, wherein the 100% demand value corresponds to 60,000 cfm (ie., the 100% highest rated flowrate capacity).

FIG. 12 is a Table comparable to FIG. 11, except entitled "Cost of Operation (2)," making a cost-savings comparison of the one hundred fans 905 of FIG. 11 with one hundred 2×2 roof fan arrays 910 in accordance with FIG. 1, wherein each array 910 is capable of 80,000 cfm (ie., 100% highest rated flowrate capacity), and operating at the demand percentages as shown in the Table, wherein the 100% demand value corresponds to 60,000 cfm (ie., the 75% highest rated flowrate capacity).

FIG. 13 is a Table comparable to FIG. 11, except entitled "Cost of Operation (3)," making a cost-savings comparison of the one hundred fans 905 of FIG. 11 with seventy-five 2×2 roof fan arrays 910 in accordance with FIG. 1, wherein each array 910 is capable of 80,000 cfm (ie., 100% highest rated flowrate capacity), and operating at the demand percentages as shown in the Table, wherein the 100% demand value corresponds to 80,000 cfm (ie., the 100% highest rated flowrate capacity).

FIG. 14 is a Table comparable to FIG. 11, except entitled "Cost of Operation (4)," making a cost-savings comparison of the one hundred fans 905 of FIG. 11 with one hundred 1×3 roof fan arrays 910 in accordance with FIG. 3, wherein each array 910 is capable of 60,000 cfm (ie., 100% highest rated flowrate capacity), and operating at the demand percentages as shown in the Table, wherein the 100% demand value corresponds to 60,000 cfm (ie., the 100% highest rated flowrate capacity).

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method configured in and, in the absence of external input of a stop or override command or condition, automatically endlessly executed by an automated electronic controller also configured to receive an electronic outer control signal meant for a single electronic commutator (EC) motor-driven fan and in consequence output an electronic inner control signal or signals for sequencing operation of an array of a multiplicity of electronic commutator (EC) motor-driven fans configured in and, in the absence of external input of a stop or override command or condition, automatically endlessly executed by an automated electronic controller also configured to receive an electronic outer control signal meant for a single electronic commutator (EC) motor-driven fan and in consequence output an electronic inner control signal or signals for; said method comprising the steps of:

providing such array of such multiplicity of such fans;

configuring the automated electronic controller to recognize that N=an integer and which=number of fans in the array=which here=4; and configuring the automated electronic controller to recognize that i=an integer and which is not only an index number for accessing data in a data set dataset(i) but is also, for all i through its range, are indices for successive steps;

configuring the automated electronic controller to populate dataset(i) with data in units of volts VDC such that as i goes from 0 to N+1:

dataset(0)=0 volts VDC,
dataset(1)=1.25 volts VDC,
dataset(2)=2.5 volts VDC,
dataset(3)=3.75 volts VDC,
dataset(4=N)=5 volts VDC, and
dataset(5=N+1)=10 volts VDC;

configuring the automated electronic controller to execute a procedure starting at a beginning;

at this beginning, receive an outer control signal in volts VDC that is confined between a range of dataset(0) volts VDC and dataset(N+1) volts VDC;

do i=0 to N:

compare outer control signal to the dataset(i) data set and find i where dataset(i) is greater than or equal to outer control signal, but outer control signal is less than dataset(i+1);

if i equal to zero, switch all fans OFF and goto stop; else, i is not zero and then:
  select i fans for operation,
    send each of the i fans an inner control signal comprising ((N/i)×outer control signal) in volts VDC except not to exceed dataset(N+1) volts VDC;
    check if i fans draw current or if i fans show other indications of response;
    switch to sending inner control signal to other fans until i fans respond,
    if not, send each of the responding fans an inner control signal comprising (N/(number of responding fans)×outer control signal) in volts VDC until inner control signal=dataset(N+1) volts VDC, then hold the inner control signal at dataset(N+1) volts VDC;
stop;
return to beginning.

2. The method of claim 1, wherein:
the step of providing such array of such multiplicity of such fans further comprises providing a 2×2 array of upblast roof exhaust fans mounted on a common weather curb cap.

3. The method of claim 1, wherein:
the step of providing such array of such multiplicity of such fans further comprises providing a 1×4 array of upblast roof exhaust fans mounted on a common weather curb cap.

4. The method of claim 1, wherein:
the steps of:
  check if i fans draw current or if i fans show other indications of response; and,
  if not;
whereby then the implication is that one or more fans are not responsive;
wherein the method of claim 1 further comprises:
  providing the automated electronic controller with accessible electronic information of which fan did not respond whereby such fan can be flagged for manual maintenance.

5. The method of claim 1, wherein:
the outer control signal comprises an instruction signal for an electronic commutator (EC) motor which such motors range between control voltages of 0 volts VDC and 10 volts VDC; and
the inner control signal comprises an instruction signal confined between 0 volts VDC and 10 volts VDC.

6. A method configured in and, in the absence of external input of a stop or override command or condition, automatically endlessly executed by an automated electronic controller also configured to receive an electronic outer control signal meant for a single electronic commutator (EC) motor-driven fan and in consequence output an electronic inner control signal or signals for sequencing operation of an array of a multiplicity of electronic commutator (EC) motor-driven fans mounted on a roof or exterior sidewall of commercial, institutional, military and/or governmental buildings for exhausting air out from the indoor environment(s) or air ducts of the such buildings; said method comprising the steps of:
  provide such array of such multiplicity of such fans;
  configuring the automated electronic controller to recognize that i and N are integers and N=number of fans in the array; and
  configuring the automated electronic controller to recognize that an inner control signal and an outer control signal are time-varying variations of a VDC power signal by which that: the inner control signal and outer control signal can be varied between 0 volts VDC and a max value volts VDC, but wherein the limits of the VDC power signal make possibilities improbable to impossible of voltage values in excess of the max value volts VDC;
  configuring the automated electronic controller to populate a data set dataset(i) with values in units of volts VDC such that:
    dataset(0)=0 volts VDC,
    dataset(N+1)=max value volts VDC; and
  then as i goes from 1 to N:
    dataset((N+1)−i)=a positive value not greater in value than dataset((N+1)−i+1);
  configuring the automated electronic controller to execute a procedure to start at begin;
begin:
  receive the time-varying outer control signal relatively timely when given;
  do i=0 to N:
    compare the received outer control signal to the dataset (i) data set and find i where dataset(i) is greater than or equal to the received outer control signal, but the received outer control signal is less than dataset(i+1);
    if i equal to zero, switch all fans OFF and goto stop;
    else,
    i is not zero and then:
      select i fans for operation,
        send each of the i fans a such-occasion inner control signal comprising ((N/i)×received outer control signal) in volts VDC;
        check if i fans draw current or if i fans show other indications of response;
        switch to sending the such-occasion inner control signal to other fans until i fans respond,
        if not, send each of the responding fans an alternate such-occasion inner control signal comprising (N/(number of responding fans)×outer control signal) in volts VDC until the alternate such-occasion inner control signal=dataset(N+1) volts VDC, then concede the alternate such-occasion inner control signal has maxed out at dataset(N+1) volts VDC;
  stop do;
  return to begin.

7. The method of claim 6, wherein:
the step of providing such array of such multiplicity of such fans further comprises providing a 2 by (N/2) array of fans mounted on a common weather-proof curb.

8. The method of claim 6, wherein:
the step of providing such array of such multiplicity of such fans further comprises providing a 1×N or (3 by (N/3)) array of fans mounted on a common weather-proof curb.

9. The method of claim 6, wherein:
the max value volts VDC is essentially 10 volts VDC.

10. A method configured in and, in the absence of external input of a stop or override command or condition, automatically endlessly executed by an automated electronic controller also configured to receive an electronic outer control signal meant for a single electronic commutator (EC) motor-driven fan and in consequence output an electronic inner control signal or signals for sequencing operation of an array of a multiplicity of fans mounted on a roof or exterior sidewall of commercial, institutional, military and/or governmental buildings for exhausting air out from the indoor environment(s) or air ducts of the such buildings; said method comprising the steps of:

provide such array of such multiplicity of such fans;

configuring the automated electronic controller to recognize that i and N are integers and N=number of fans in the array; and configuring the automated electronic controller to recognize that an inner control signal will be a time-varying variation of an outer control signal but both which vary between a common min value and common max value;

configuring the automated electronic controller to populate a data set dataset(i) with values in units of volts VDC such that:

dataset(0)=min value;

dataset(N+1)=max value; and then as i goes from 1 to N:

dataset((N+1)−i)=a positive value not greater in value than dataset((N+1)−i+1);

configuring the automated electronic controller to execute a procedure to start at begin;

begin:

receive the time-varying outer control signal relatively timely when given;

do i=0 to N:

compare the received outer control signal to the dataset (i) data set and find i where dataset(i) is greater than or equal to the received outer control signal, but the received outer control signal is less than dataset(i+1);

if i equal to zero, switch all fans OFF and goto stop; else, i is not zero and then:

select i fans for operation, send each of the i fans a such-occasion inner control signal comprising ((N/i)×received outer control signal);

check if i fans draw current or if i fans show other indications of response;

switch to sending the such-occasion inner control signal to other fans until i fans respond, if not, send each of the responding fans an alternate such-occasion inner control signal comprising (N/(number of responding fans)×outer control signal) until the alternate such-occasion inner control signal=dataset(N+1), then concede/acquiesce to the alternate such-occasion inner control signal has maxed out at dataset(N+1);

stop do;

return to begin.

11. The method of claim 10, wherein:

the step of providing such array of such multiplicity of such fans further comprises providing a 2 by (N/2) array of fans mounted on a common weather-proof curb.

12. The method of claim 10, wherein:

the step of providing such array of such multiplicity of such fans further comprises providing a 1×N or (3 by (N/3)) array of fans mounted on a common weather-proof curb.

13. The method of claim 10, wherein:

the steps of:

check if i fans draw current or if i fans show other indications of response; and, if not, then thereby the implication is that one or more fans are not responsive;

wherein the method of claim 10 further comprises:

providing the automated electronic controller with accessible electronic information of which fan did not respond whereby such fan can be flagged for manual maintenance.

* * * * *